March 7, 1967 M. J. BOYAJIAN 3,308,364
ELECTRIC MOTOR SPEED CONTROL
Filed May 7, 1964
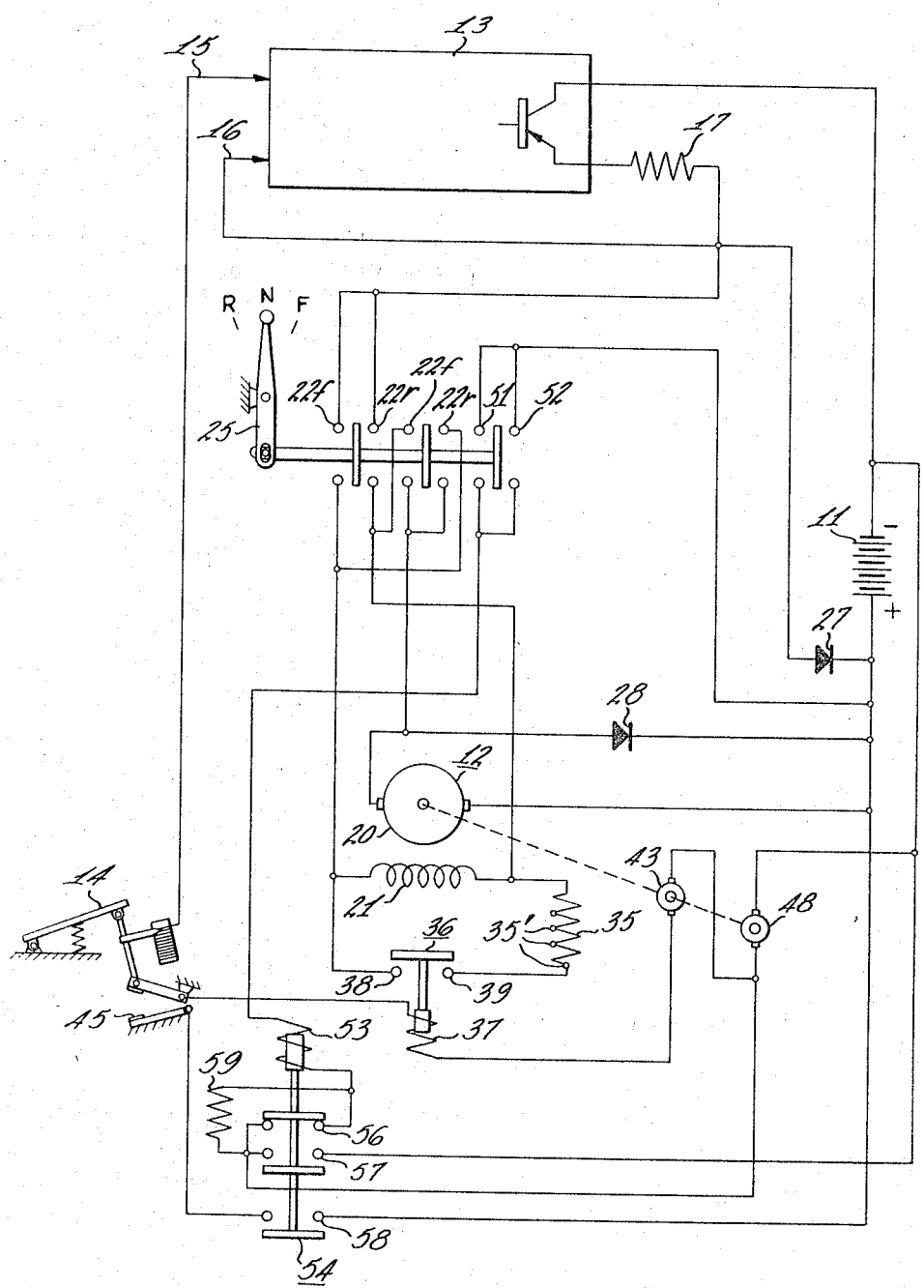
Inventor
Myron J. Boyajian
By Charles L. Schwab
Attorney 3,308,364
ELECTRIC MOTOR SPEED CONTROL
Myron J. Boyajian, Chicago, Ill., assignor to Allis-Chalmers Manufacturing Company, Milwaukee, Wis.
Filed May 7, 1964, Ser. No. 365,576
8 Claims. (Cl. 318—358)

This application relates generally to controls for direct current motors. More specifically this invention relates to a motor system for an electric vehicle such as an electrically powered fork lift truck.

In a direct current motor the relationship between the field current and the armature current establishes the relationship between motor torque and motor speed. Thus, adjusting the field current of a D.C. motor is analogous to shifting gears in a mechanical system; the operation provides a different relationship between torque and speed, but it does not change the power output of the system except as the torque-speed relationship of the load requires more or less than before. Direct current motors are frequently constructed or controlled to have high field strength at low speeds for high torque and to have a weakened field strength at high speed for high armature current for high power. A simple series wound D.C. motor, in which the field current equals the armature current, approximates this relationship. Various controls are known for adjusting the relationship between the field current and the armature current to get a torque-speed relationship that is appropriate for a particular load. The specific examples that will be discussed later use only the speed control technique of weakening the field strength by paralleling the field winding with a resistor, but the applicable principles and most of the specific structure will apply to other control techniques.

One potential advantage of field weakening by means of a resistor is that the field could be made stronger in the low speed range where the truck requires high torque. Another potential advantage is that motors could operate at low torque for running at higher speed. However, there has been a problem controlling electric fork lift trucks with motor systems that have multiple ranges of field strength; with the well known variable resistor drives, which change the motor power in discrete steps, the truck tends to lurch with a high torque motor. Since field weakening presents the problem that under heavy loads the field weakened motor may draw very excessive current, these controls have required current responsive protective devices.

For smooth application of power in the low speed range and over current protection in the high speed range, the preferred embodiment of the control of this invention uses the pulse width modulation drive disclosed in an application of Tom N. Thiele, S.N. 232,462, assigned to the assignee of this invention.

One object of this invention is to provide a new and improved D.C. motor system with means to adjust the relationship between field current and armature current; a more specific object is to provide such a control that is made responsive to operating conditions of an electric vehicle to operate in the optimum speed range.

One consideration in establishing these controlling conditions is that the motor uses less power in its high field strength operation condition. For example, whenever the motor is switched from the low speed condition to the high speed condition, the motor torque tends to decrease as the field is weakened, but the armature draws more current and accelerates the truck to a high speed; because the truck requires more power at the higher speed, the motor takes more power from the battery (the armature current increases out of proportion to the decrease in field strength). Thus, it is desirable to keep the motor system in its low speed condition unless the operator actually needs additional power for high speed. The motor control system of this invention includes a speed responsive control and a driver selected control that cooperate to shift the system into its high speed state when the motor is above a predetermined speed if and only if the operator also has selected the high speed range. When the motor slows down to a second slightly lower predetermined speed, the control shifts back into the low speed range without regard to the speed range selected by the operator.

One of the features of the control is that the operator selector is made to operate from the truck accelerator control (typically a foot pedal). Preferably, the accelerator control is set so that the operator has depressed the foot pedal fully to call for full power in the motor system.

One of the features and objects of the control of this invention is the provision of an interlock circuit to prevent the motor from being operated in its high speed range during dynamic braking, thus making full torque available for the latter function. The interlock circuit responds to a change in direction of the direction control to place the motor in the low speed range which condition will persist until the motor has also changed direction and attained a predetermined speed and the accelerator pedal is in its depressed position calling for full power.

The drawing and the detailed description of the invention will suggest other aspects and goals of the system and corresponding features of the invention.

The single figure of the drawing shows the control of this invention as it is applied to an electric fork lift truck.

*Introduction.*—The drawing shows the control of this invention as it is used in a fork lift truck having a direct current power source such as a battery 11, a series wound motor 12 and a device 13 that is connected to modulate power from battery 11 to motor 12 according to the position of an operator control in the form of a foot pedal 14. The modulating device 13 is preferably a pulse width modulator using semiconductors (as the single transistor schematically represents) to switch the battery 11 on and off at a constant frequency. Device 13 keeps motor 12 energized for a portion of each cycle that is selected by a manual input 15 generated from the foot pedal 14. Device 13 also includes an input 16 that is internally connected to limit the on time in response to a current signal that is developed across a resistor 17 connected in circuit with motor 12. The preferred pulse width modulator is described in detail in application S.N. 232,462 of Tom N. Thiele. Motor 12 includes an armature winding 20 and a field winding 21 and a set of forward and reverse contacts 22f, 22r, that are operable by means of a direction controlling switch 25 to establish the polarity relationship of windings 20 and 21 to control the direction of motor 12. A diode 27 is connected across the windings 20, 21 of motor 12 to conduct when the pulse width modulator 13 is turned off according to the energy stored in the magnetic field. A second diode 28 is connected across the motor armature winding 20 to control the voltage developed across the armature during regenerative braking; (when the direction control is shifted while the truck is still moving).

The motor system as it has been described so far is now well known. The operator selects the truck direction by means of control 25 and then depresses the foot pedal 14 to start the truck. At low speeds the motor 12 may draw excessive current and a sufficient signal is developed at input 16 to cause the motor device 13 to limit the pulse width to an appropriate value.

*The two speed range control.*—As the motor system has been described so far, it would operate conventionally in a single speed range in which the field current equals the armature current. In the motor system of this invention, motor 12 is constructed to have a particularly high value of field strength for motor 12 to provide very high torque for driving heavy mechanical loads at low speed. The control for shifting the system to the high speed range includes a resistor 35 and a contactor 36 that operates in response to a current at the terminals of its coil 37 to close its contacts 38, 39 and connect resistor 35 in parallel with field winding 21. When contactor 36 is closed, the field current is reduced in relation to the armature current according to the relative impedances of resistor 35 and field winding 21. This allows the motor to produce its maximum torque at a higher speed and to develop more power.

The control shifts to the high speed range only under predetermined condition, namely operating position of the selector control 25, motor speed and position of the speed control member (pedal 14). In the illustrated preferred embodiment of the control, a conventional centrifugal switch 43 is mechanically connected to the shaft of motor 12 to close its contacts when the motor reaches a predetermined speed and to reopen contacts when the speed falls somewhat below this value. (The opening and closing values are made different to prevent system hunting.) A second pair of contacts in a switch 45 are arranged to be closed at a predetermined position of foot pedal 14. Switches 43, 45 are connected in series to form an AND logic circuit energizing coil 37 of contactor 36 from battery 11 only when the direction control is in a truck operation position, the motor is running above a predetermined speed in the direction called for by the direction control, and the operator has depressed the foot pedal 14 to a predetermined point.

Ordinarily it is desirable to operate in the low speed range (strong field) even when running the truck at relatively high speed. The motor system operates more efficiently in the low speed range, aside from the actual speed of the motor, because the armature current is lower and the $I^2R$ losses in the windings 20, 21 are less than in the high speed range. Similarly the $I^2R$ losses of resistor 35 make the system less efficient in the high speed range. Therefore, it is economical to use the high speed range only for a maximum power, and in the illustrated embodiment there is no range of adjustment of pedal 14 within the high speed range. Switch 45 is set to close only when pedal 14 is fully depressed. The top speed requirement may be different for different lift truck operations and for this reason means for varying the field shunt resistance is provided in the form of a plurality of taps 35' on the shunt resistor 35.

*Dynamic braking.*—An interlock circuit is interconnected between the direction control 25 and the high speed control circuit for resistor 35 to prevent the motor from being in its high speed range when dynamic braking. Movement of the direction control 25 to one of its forward and reverse operating positions bridges one of the two sets of contacts 51, 52 thus energizing coil 53 of a relay 54 causing normally closed contacts 56 to be opened and normally open contacts 57, 58 to be closed. Coil 53 remains energized because of current flow through contacts 57 and resistor 59. Initial energizing of coil 53 of the relay occurs only if a normally closed speed switch 48 connected to the shaft of motor 12 is closed. Switch 48 opens upon the motor attaining a predetermined speed which is below the speed required to close switch 43.

Assuming the operator is operating the motor 12 in its high speed range in a forward direction, the direction control will be in its F or forward position, the accelerator will be depressed to close switch 45, the motor speed will be above the closing speed for switch 43 and interlocking circuit relay 54 will be in its energized position. In this condition current flows through contacts 57, switch 43, coil 37, switch 45 and contacts 58. Assuming further that the operator wishes to employ dynamic braking (motor power braking), the operator will release the accelerator 14 opening accelerator operated switch 45 causing the shunt contactor coil 37 to deenergize opening contacts 38, 39 and disconnecting shunt resistance 35. The direction control 25 is moved to its reverse position and when contacts 51 are opened the relay coil 53 deenergizes causing contacts 57, 58 to open and contacts 56 to close. When the direction control 25 has completed its movement to its R or reverse position, the contacts 52 will be closed, however, the relay coil 37 will not be energized because the motor 12 is running fast enough to cause normally closed speed sensitive switch to remain open. Assuming the operator calls for full power dynamic braking (plugging) by depressing the pedal 14 enough to close contacts 45, the motor will still not be placed in its high speed range because switch 48 will still be open due to rotation of the motor thus preventing relay coil 53 from being energized. The motor must be brought to a relatively low speed before the contacts of speed responsive switch 48 closes to permit the relay 54 to be energized. Thus full motor torque is available for dynamic braking and the interlock circuits 51, 52, 54, 48 automatically prevent the motor from being placed in its high speed range operating condition during dynamic braking, even though the truck in which this control is used is traveling above the shift speed and the driver has fully depressed the accelerator pedal 14. This is true in either the forward or reverse operation of the motor.

*Other embodiments.*—A variety of well known devices can be substituted for the specific components illustrated to achieve the functional relationships that the drawing represents. For example, the motor current which is indicated by the voltage drop across resistor 17 is a partial measure of motor speed, and a measure of the signal at input 16 can be used to actuate a switch connected in circuit where the drawing shows switch 43. Similarly, the counter E.M.F. of motor 12 corresponds to some extent to the motor speed and to field strength, and a measure of the motor speed can be derived as a function of armature current (the voltage drop across resistor 17) and a measure of field strength (which is a simple two state condition depending on the state of contactor 36). The centrifugal switch 43 will suggest similar devices responsive to the mechanical rotation of the armature shaft, such as a tachometer generator having its output connected to a frequency sensing electrical circuit energizing coil 37.

Those skilled in the art will recognize other variations in the specific motor system discussed in the spirit of the invention and the scope of the claims.

The embodiments of the invention for which an exclusive property or privilege is claimed are defined as follows:

1. A motor system comprising:
    an electric motor having an armature winding and a field winding, the latter being adjustable to operate in at least two ranges of field strength,
    means for selectively operating said motor in either direction of rotation,
    means for adjusting the speed of said motor according to a manual input, and
    means for adjusting the field current independently of the armature current, said last mentioned means including means responsive to manual selection and to motor speed to weaken the motor field only at the coincident selection of the field weakening condition by the motor system operator and operation of said motor above a predetermined speed and means for automatically placing the system in its high field strength operating condition during dynamic braking.

2. A system according to claim 1 in which said system is operable in its low field strength condition only when said manual input to said motor speed adjusting means is in its position for maximum power to said motor.

3. A motor system adapted for use in an electric vehicle comprising:
   an electric motor having an armature winding and a field winding,
   a manually operated direction control for said motor and
   motor speed range control means for adjusting the field current independently of the armature current to effect a high speed range operation of said motor including
   a manually operated element and
   a motor speed sensing means,
   said motor speed range control means operating to effect said high speed range operation of said motor only when said manually operated element is actuated and said motor speed sensing means senses a motor speed in excess of a predetermined value.

4. The structure set forth in claim 3 and further comprising means for preventing said motor speed range control means from effecting a high speed range operation of said motor during dynamic braking of the latter.

5. A motor system comprising:
   an electric motor having an armature winding and a field winding, the latter being adjustable in at least two ranges of field strength,
   means for adjusting the speed of said motor according to a manual input, the lower range of field strength being obtained only in a predetermined position of said manual input, and
   means for adjusting the field current independently of the armature current, said last mentioned means including means responsive to manual selection and to motor speed to weaken the motor field only at the coincident selection of the field weakening condition by the motor system operator moving said manual input to said predetermined position and operation of said motor above a predetermined speed.

6. A system according to claim 5 in which the position of said manual input for low field strength operation is the position of maximum power to the motor.

7. A motor system adapted for use in an electric vehicle comprising:
   an electric motor having an armature winding and a field winding,
   a manually operated direction control for said motor and
   motor speed range control means for adjusting the field current to effect a high speed range operation of said motor including:
   a manually operated element and
   a motor speed sensing means,
   said motor speed range control means operating to effect said high speed range operation of said motor only when said manually operated element is actuated and said motor speed sensing means senses a motor speed in excess of a predetermined value.

8. The structure set forth in claim 7 and further comprising means for preventing said motor speed range control means from effecting a high speed range operation of said motor during dynamic braking of the latter.

References Cited by the Examiner
UNITED STATES PATENTS

| 1,306,484 | 6/1919 | Hunter | 318—418 |
| 2,342,756 | 2/1944 | Riley | 318—365 |

ORIS L. RADER, *Primary Examiner.*

J. C. BERENZWEIG, *Assistant Examiner.*